G. W. DRAPER.
TRANSMISSION GEARING.
APPLICATION FILED JAN. 24, 1914.
1,140,256.
Patented May 18, 1915.
4 SHEETS—SHEET 1.
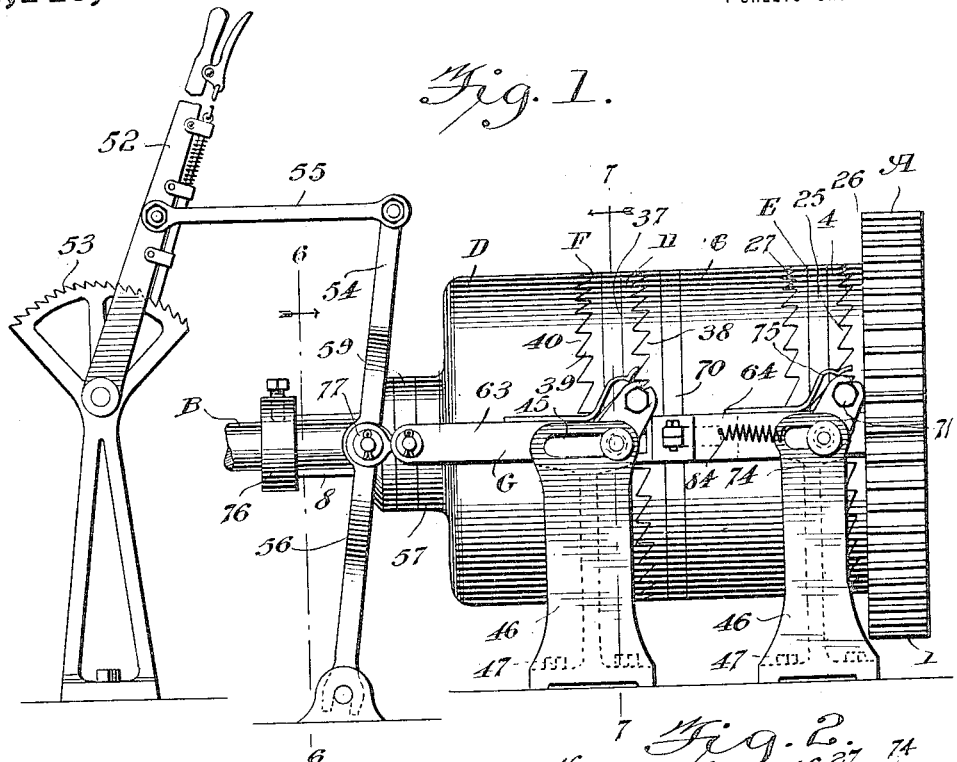
Fig. 1.
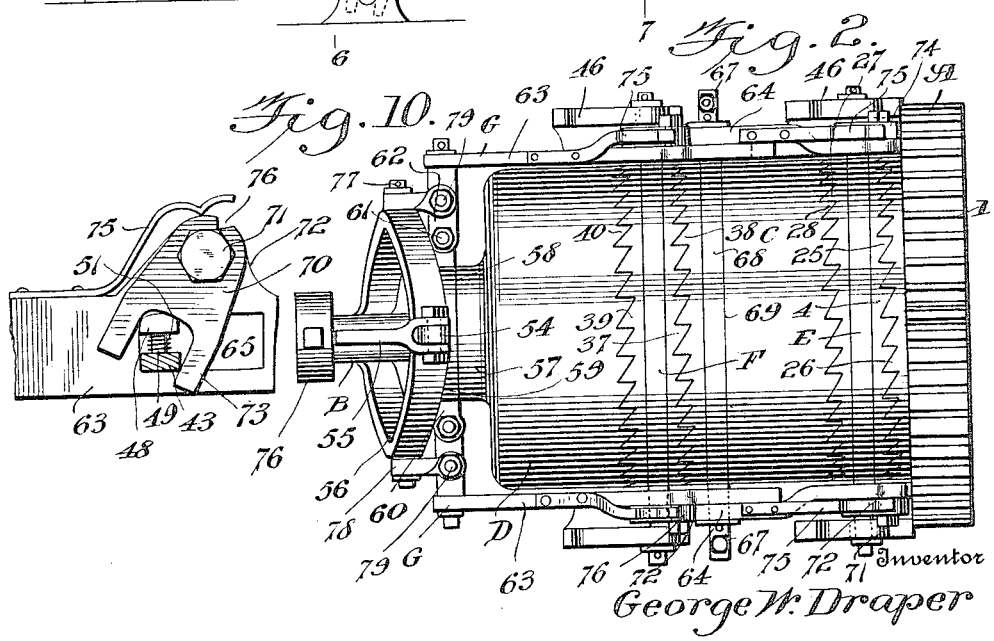
Fig. 2.
Fig. 10.
Witnesses
Inventor
George W. Draper
By Victor J. Evans
Attorney

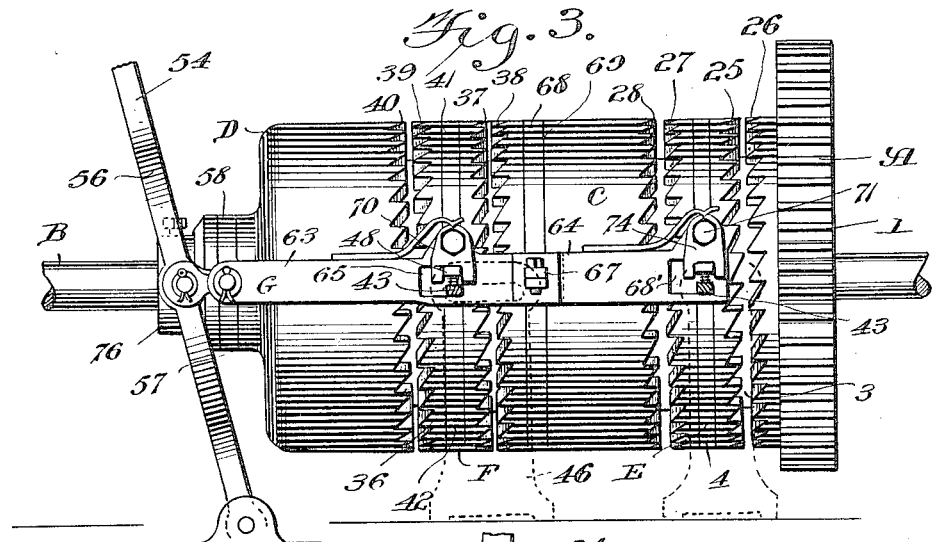
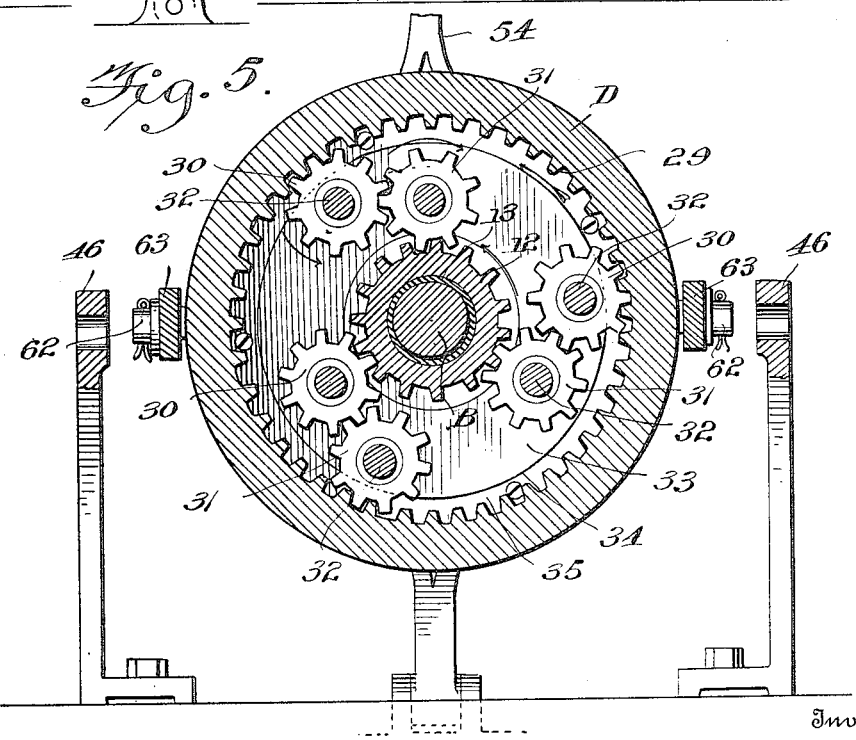

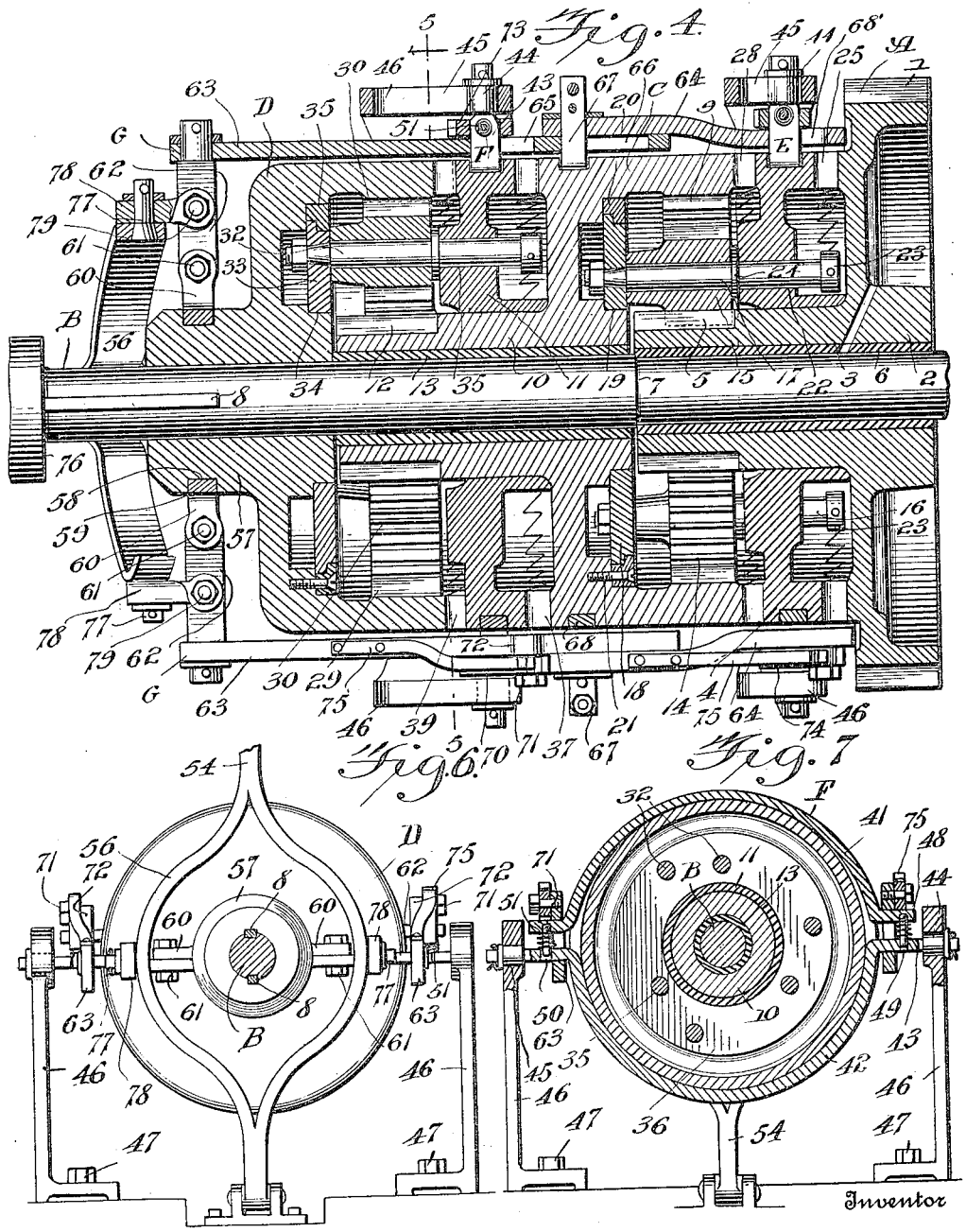

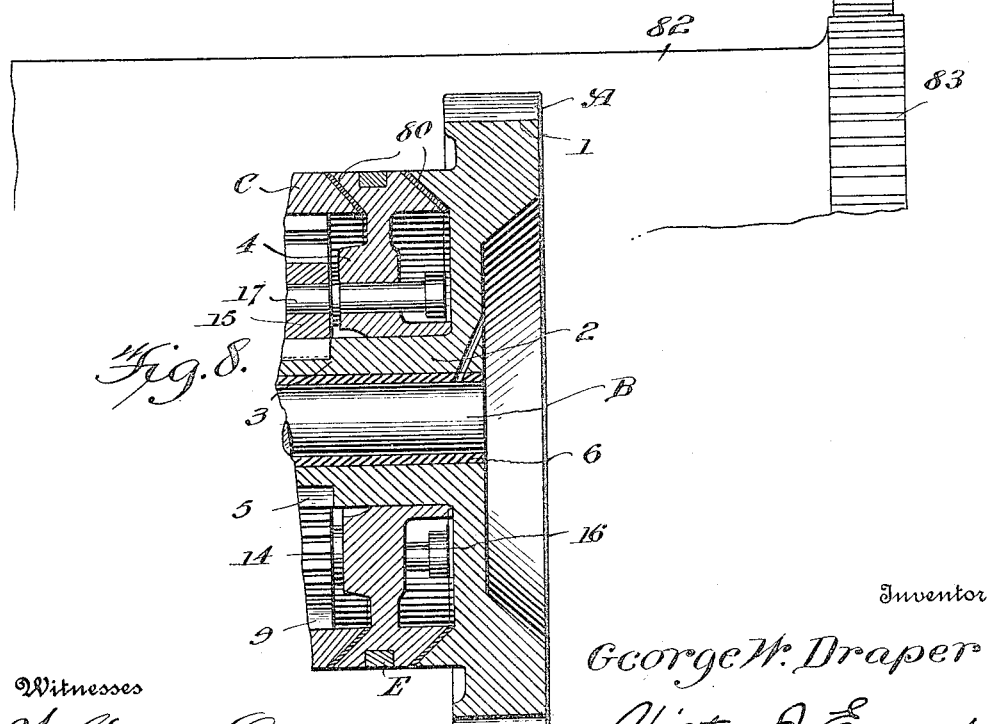

UNITED STATES PATENT OFFICE.

GEORGE W. DRAPER, OF FAIR HAVEN, VERMONT.

TRANSMISSION-GEARING.

1,140,256.     Specification of Letters Patent.     Patented May 18, 1915.

Application filed January 24, 1914. Serial No. 814,166.

*To all whom it may concern:*

Be it known that I, GEORGE W. DRAPER, a citizen of the United States, residing at Fair Haven, in the county of Rutland and State of Vermont, have invented new and useful Improvements in Transmission-Gearing, of which the following is a specification.

This invention relates to speed reducing gearing the object of the invention being to produce in connection with a driving element and a driven element, interposed transmission gearing whereby the motion of the driving element is transmitted to the driven element and at the same time provision made for varying the speed of the driven element relatively to the driving element, the said means involving a novel combination and arrangement of elements producing a compact, efficient and reliable changeable speed transmission gearing.

With the above and other objects in view, the invention consists in the novel construction, combination and arrangement of parts, as will hereinafter be more fully described, illustrated and claimed.

In the accompanying drawings: Figure 1 is a side elevation showing the transmission gearing of this invention together with the manual operating means therefor, the gearing being shown arranged for what is known as direct drive in which the initial driving and final driven elements are rotated at the same speed. Fig. 2 is a plan view of the same. Fig. 3 is a side elevation similar to Fig. 1 showing the arrangement of the parts for producing a different speed between the initial driving element and the final driven element. Fig. 4 is a diametrical section through the same on an enlarged scale. Fig. 5 is a cross section on the line 5—5 of Fig. 4. Fig. 6 is a section on the line 6—6 of Fig. 1. Fig. 7 is a section on the line 7—7 of Fig. 1. Fig. 8 is a detail section on the same line as Fig. 4 showing the use of friction clutch faces in lieu of positive clutch faces. Fig. 9 is a diametrical view of an arrangement in which the initial driving and final driven elements are transposed to adapt the gearing to drive hoisting drums and other heavy machinery where the shaft is run at a constant speed. Fig. 10 is a detail side elevation partly in section illustrating the operation of one of the clamping dogs.

The transmission gearing contemplated in this invention will first be described as a speed reducing gear in which a shaft may be driven at varying speeds (high, low or intermediate) relatively to the initial driving element which is in the form of a spur gear wheel adapted to be driven by another motor actuated wheel (not shown). Under such arrangement, A designates the initial driving element and B the final driven element. The driving element A comprises a spur gear face 1 and a hub 2, the latter being mounted to revolve upon the driven element B which is shown in the form of a shaft extending centrally and longitudinally through the transmission gearing as a whole.

The hub 2 of the driving gear wheel A is provided with an inwardly extending sleeve 3 upon which is journaled a clutch collar 4 which under one adjustment is free to revolve on the sleeve 3 and in another adjustment is held stationary for a purpose which will hereinafter appear. The hub 2 of the gear A also carries a central pinion 5 which is shown as formed integrally with the gear wheel A but it may, of course, be made separately therefrom and secured thereto in fixed relation. The hub 2 contains a bushing 6 and the shaft B is formed with a shoulder 7 against which the inner end of the bushing 6 bears so as to prevent the driving element A from sliding longitudinally of said shaft B when the other parts hereinafter referred to are slid longitudinally of said shaft to change the ratio of gearing.

C designates an intermediate gear and D a driven gear which is connected by keys 8 to the shaft B so as to rotate with said shaft and yet be capable of sliding longitudinally thereof in order to shift the gears. The intermediate gear C is provided with an internal gear face 9, the purpose of which will presently appear and is extended to form a sleeve-like bearing 10 for a second clutch collar 11 which may rotate on the sleeve-like bearing 10 or be held stationary as will hereinafter appear. The hub of the intermediate gear C also carries a spur pinion 12 having a fixed relation to the body of said intermediate gear so as to rotate therewith. 13 designates a bushing within the intermediate gear C and surrounding the shaft B. The intermediate gear C like the initial driving gear A is normally loose on and revolves independently of the shaft B.

By reference to Fig. 4 it will be observed that I employ planetary pinions 14 and 15, the spindles or journals 16 and 17 of which are fastened to a revoluble planetary bearing ring 18 best illustrated in Fig. 4, the said ring 18 being mounted in an annular recess 19 in the adjacent face of the body of the intermediate gear C and being held in place by means of a retainer ring 20 in turn fastened in place by screws 21 or their equivalent. The spindles 16 and 17 also pass through bearing openings 22 in the clutch collar 4 as shown in Fig. 4 and are adapted to slide through the openings 22, said sliding movement being limited by stops 23 shown in the form of heads formed on the extremities of said spindles 16 and 17. Each of said spindles is also provided at a point between the clutch collar 4 and the adjacent pinion with a stop collar or flange 24 so that the pinions are confined between said collars or flanges 24 and the rotatable ring 18. Therefore, when the intermediate gear C is moved away from the initial driving gear A, the planetary pinions 14 and 15 are carried along with said intermediate gear and maintained in mesh with the internal gear face 9 above referred to and also in mesh with the central pinion 15, the teeth of which are long enough to admit of the full sliding movement of the planetary pinions 14 and 15 as shown in Fig. 4. The clutch collar 4 is provided on one side with a clutch face 25 which is adapted to engage a corresponding clutch face 26 on the adjacent side of the driving gear A. The clutch collar 4 is also provided on its opposite side with a clutch face 27 adapted to engage a corresponding clutch face 28 on the adjacent side of the intermediate gear C as clearly illustrated in Figs. 1, 2 and 3 and by comparing Figs. 1 and 3, for example, it will be seen that all of said clutch faces may be simultaneously engaged with each other as in Fig. 1 or be thrown out of engagement as shown in Fig. 3 the purpose of which will appear. In like manner, the driven gear D is provided with an internal gear face 29 and between the gear face 29 and the central pinion 12, other planetary pinions 30 and 31 are interposed, the arrangement of said planetary pinions being the same as that illustrated in Fig. 5, the spindles 32 of said pinions being fastened to an annular planetary bearing ring 33 mounted to turn in an annular recess 34 in the adjacent face of the driven gear D and being held in place by means of a retainer ring 35 similar in all respects to the retainer ring 20 hereinabove referred to. The spindles 32 like the spindles 17 are also slidable through openings 35 in the clutch collar 11 which is adapted to turn on the extension 10 of the intermediate gear C and which is provided at one side with a clutch face 37 adapted to engage a corresponding clutch face 38 on the intermediate gear C, said clutch collar 11 being provided at its opposite side with another clutch face 39 adapted to engage a corresponding clutch face 40 on the driven gear D as shown in Figs. 1, 2 and 3. The planetary pinion and gear arrangement as well as the sliding clutch collar hereinabove particularly described is duplicated as shown in Fig. 4, the operation of one set of planetary gears being the same as that of the other set and both sets having the same sliding movement longitudinally of the shaft B. In connection with the clutch collar 4 I employ a clutch band E and in connection with the clutch collar 11 I employ a similar clutch band F. One of these clutch bands in its relation to the clutch collar is clearly illustrated in Fig. 7 wherein it will be seen that each of said clutch collars is formed in two substantially equal and semi-circular sections 41 and 42, the section 42 being provided with diametrically opposite laterally projecting trunnions 43 carrying rollers 44 which move in guide slots 45 extending longitudinally of the shaft B and formed in guides 46 fastened at 47 to any convenient support. The other section 41 of the clutch band is provided with diametrically opposite ears 48 having projecting pins 49 which are slidable through openings 50 in the trunnions 43 as shown in Fig. 7, springs 51 being placed around the pins 49 and interposed between the sections of the clutch band so as to expand said clutch band and leave the clutch collar normally loose and free to rotate. When, however, the sections 41 and 42 are drawn toward each other so as to contract the clutch band, the latter grips the clutch collar and holds the same stationary, thereby preventing the planetary pinions from following their planetary course.

The means for shifting the clutch collars 4 and 11 and also contracting the clutch bands E and F will now be described. Referring first to Fig. 1, 52 designates a thumb latch lever adapted to be manually operated, said lever operating in connection with a holding rack 53 arranged at any suitable point. 54 designates an operating lever which is connected to the thumb latch lever 52 by means of a connecting rod 55. Referring now to Fig. 6 it will be observed that the operating lever 54 is bifurcated or formed intermediate its ends with a loop 56 adapted to embrace the shaft B and the hub 57 of the driven gear D. Mounted loosely in a groove 58 in the hub 57 is a shifting ring 59 having diametrically opposite arms or lugs 60. Connected to the arm 60 by means of bolts 61 or their equivalent are laterally and oppositely projecting extensions or arms 62 to the extremities of which are attached sectional link rods designated at G. As shown in Figs. 1, 2, 3 and 4, each of said link rods comprises two separate and independently movable sections 63 and 64, the section 63 of each link rod being formed with a longitudinal slot 65 which receives the ears 48 and the trunnions 43 at one side of the clutch band F above described. The section 63 also comprises another longitudinal slot 66 which receives one of a pair of diametrical lugs 67 on a shifting ring 68 which is mounted loosely in an annular groove 69 in the outer periphery of the intermediate gear C for the purpose of shifting said gear. The other section 64 of the link rod is formed with an opening to receive the lug 67 of the shifting ring and said section 64 is also formed with a longitudinal slot 68' which bears the same relation to the clutch band E as the slot 66 referred to bears to the clutch band F, the only difference being that the slot 66 is of greater length than the slot 68 to enable the clutch band F to move approximately twice the distance of the clutch band E in shifting the clutch faces of the clutch collars out of engagement with the other clutch faces with which they coöperate as hereinabove described.

From the foregoing description it will be seen that when the lever 54 is moved away from the driving gear A, as in Fig. 3, the link rods G in connection with the ring 59 and the other parts connected with said link rods will operate to slide the driven gear D, the intermediate gear C, and the clutch collars 11 and 4 longitudinally of the shaft B for the purpose of disconnecting the clutch faces of the clutch collars 4 and 11, shifting the parts from the position shown in Figs. 1 and 4 to the position illustrated in Fig. 3, a reverse movement of the operating lever 54 restoring said parts to the position shown in Figs. 1 and 4.

In order to shift one set of planetary gears without simultaneously shifting the other set, and in order to individually lock each clutch collar, I employ in connection with each link rod section 63, a clamping dog 70 one of which is illustrated in the detail view Fig. 10 wherein it will be seen that the dog 70 is pivotally mounted on a bolt 71 or its equivalent connected to an extension 72 of the link rod section 63. The dog 70 is bifurcated or provided with two arms 73 which embrace the adjacent ear 48 of one of the clutch bands E and F and it will be observed in Fig. 10 that when the dog is rocked from the position therein shown, to a substantially vertical position, it will have a cam-like action on the ear 48, thereby forcing the section 41 of the clutch band tightly against the respective clutch collar, the said clutch band then acting to hold said collar stationary and consequently the planetary pinions will be prevented from rotating around the shaft B and will be caused to transmit motion from the central pinion to the internal gear face coöperating therewith. In like manner other clamping dogs 74 are carried by the link rod section 64 and bearing the same relation to the clamping band E. In connection with each of the dogs 70 and 74 I employ a spring detent 75 which engages a notch 76 in the respective dog in order to retain said dog in clamping position as shown in Fig. 3.

76 designates a stop collar on the shaft B to limit the sliding movement of the driven gear D and 77 designates studs whereby the looped portion of the lever 54 has a jointed connection with the arms 62 through laterally projecting arms 78 fastened to the arms 62 at 79.

In lieu of the positive clutch faces 25 and 26, etc., hereinabove referred to, friction clutch faces 80 may be employed as indicated in Fig. 8, the construction otherwise being the same as that hereinabove described.

Where it is desired to use the mechanism hereinabove described for driving hoisting drums and the like, the arrangement shown in Fig. 9 may be employed. In said figure 81 and 82 designate drums provided with spur gears 83 which mesh with the spur gear face 1 of what has been described as the driving gear. Under the arrangement shown in Fig. 9, however, the shaft B will constitute the driving element runs at constant high speed and the gear 1 will constitute the driven element which may be run at varying speeds so that the rapid rotation of the shaft B may be reduced to any desired extent before motion is imparted to the drums 81 and 82.

From the foregoing description it will now be seen that by moving the operating lever 54 to the left in Fig. 1, the link rod sections 63 are first operated and they serve to throw the clutch faces 37, 38, 39 and 40 out of engagement and then lock the clutch collar 11 from rotating. Thereupon, the motion of the initial driving element A is transmitted through the clutch faces 25, 26, 27 and 28 to the intermediate gear C and from the latter through the central pinion 12, planetary gears and internal driving gear face 29 to the driven gear D which being keyed to the shaft revolves said shaft B at the same speed as said driven gear D the speed of which, however, is reduced as compared with the speed of the gear C through the planetary pinions. By moving the lever 54 in the same direction to its full extent, the clutch faces 25, 26, 27 and 28 are disengaged as shown in Fig. 3, and the collar 11 then locked, and thereupon the motion of the gear A is transmitted through the pinion 5, planetary gears and internal gear face 9 to the intermediate gear C thus reducing the speed of said gear C as compared with the gear A. Then through the other intermediate pinion 12, planetary pinions and internal gear face 29 the driven gear D is revolved at a speed proportionately less than the intermediate gear C. In this way a double reduction of speed is obtained between the initial driving element A and the final driven element B. Of course, when the element B is used as the driving member and the element A is employed as the driven member, a reverse ratio of speed will be obtained for the purpose set forth. In order to insure the movement of the sections 63 of the link rods before the movement of the other sections 64, one or more additional resistance springs 84 may be interposed between the sections 64 and the adjacent guides 46 as shown in Fig. 1. This gives greater resistance to the movement of the sections 64 than the sections 63 and insures the shifting of the member D before the shifting of the member C.

What I claim is:—

1. In transmission gearing, a central shaft, a driving wheel normally loose on said shaft, a pinion having a fixed and concentric relation to said driving wheel, an internal gear wheel normally loose on said shaft, planetary pinions meshing with said pinion and internal gear wheel, means to control the operation of the said planetary pinions, and means interposed between said internal gear wheel and shaft for causing them to rotate together.

2. In transmission gearing, a central shaft, a driving wheel normally loose on said shaft, a reducing pinion having a fixed and concentric relation to said driving wheel, an internal gear wheel normally loose on said shaft, a revoluble ring supported by said internal gear wheel, planetary pinions journaled on and carried by said ring and meshing with said reducing pinion and internal gear wheel, means coöperating with the revoluble ring to control the operation of the planetary pinions, and means interposed between said internal gear wheel and shaft causing them to rotate together.

3. In transmission gearing, a central shaft, a driving wheel normally loose on said shaft, a reducing pinion fast on the hub of said driving wheel and concentric therewith, an internal gear wheel normally loose on said shaft, a revoluble ring supported by said internal gear wheel, planetary pinions journaled on and carried by said ring and meshing with said reducing pinion and internal gear wheel, means coöperating with the revoluble ring to control the operation of the planetary pinions, means interposed between said internal gear wheel and shaft causing them to rotate together, said driving wheel having a clutch face, said internal gear wheel having a clutch face, a clutch collar between said clutch faces, and means for shifting said internal gear wheel and clutch collar to throw the clutch faces thereof into and out of engagement.

4. In transmission gearing, a central shaft, a driving wheel normally loose on said shaft, a reducing pinion fast on the hub of said driving wheel and concentric therewith, an internal gear wheel normally loose on said shaft, a revoluble ring supported by said internal gear wheel and arranged at one side thereof, planetary pinions carried by said ring, means coöperating with the revoluble ring to control the operation of the planetary pinions, a second internal gear wheel, a second set of planetary pinions meshing therewith, means to control the last named set of planetary pinions, and a second reducing pinion fast on the hub of the first named internal gear wheel, the second internal gear having a keyed and sliding connection with said shaft.

5. In transmission gearing, a central shaft, a driving wheel normally loose on said shaft, a reducing pinion fast on the hub of said driving wheel and concentric therewith, an internal gear wheel normally loose on said shaft, a revoluble ring supported by said internal gear wheel and arranged at one side thereof, planetary pinions carried by said ring, means coöperating with the revoluble ring to control the operation of the planetary pinions, a second internal gear wheel, a second set of planetary pinions meshing therewith, means to control the last named set of planetary pinions, a second reducing pinion fast on the hub of the first named internal gear wheel, the second internal gear having a keyed and sliding connection with said shaft, the first named internal gear wheel having clutch faces on both sides thereof, said driving wheel and second internal gear wheel having clutch faces, clutch collars between said clutch faces, and means for shifting both internal gear wheels and clutch collars to engage and disengage said clutch faces.

6. In transmission gearing, a central shaft, a driving wheel normally loose on said shaft, a reducing pinion fast on the hub of said driving wheel and concentric therewith, an internal gear wheel normally loose on said shaft, a revoluble ring supported by said internal gear wheel and arranged at one side thereof, planetary pinions carried by said rings, means coöperating with the revoluble ring to control the operation of the planetary pinions, a second internal gear wheel, a second set of planetary pinions meshing therewith, means to control the last named set of planetary pinions, a second reducing pinion fast on the hub of the first named internal gear wheel, the second internal gear having a keyed and sliding connection with said shaft, the first named internal gear wheel having clutch faces on both sides thereof, said driving wheel and second internal gear wheel having clutch faces, clutch collars between said clutch faces, and means for shifting both internal gear wheels and clutch collars to engage and disengage said clutch faces either severally or collectively.

7. In transmission gearing, a central shaft, a driving wheel normally loose on said shaft, a reducing pinion fast on the hub of said driving wheel and concentric therewith, an internal gear wheel normally loose on said shaft, a revoluble ring supported by said internal gear wheel and arranged at one side thereof, planetary pinions carried by said ring, means coöperating with the revoluble ring to control the operation of the planetary pinions, a second internal gear wheel, a second set of planetary pinions meshing therewith, means to control the last named set of planetary pinions, a second reducing pinion fast on the hub of the first named internal gear wheel, the second internal gear having a keyed and sliding connection with said shaft, the first named internal gear wheel having clutch faces on both sides thereof, said driving wheel and second internal gear wheel having clutch faces, clutch collars between said clutch faces, means for shifting both internal gear wheels and clutch collars to engage and disengage said clutch faces either severally or collectively, said means embodying a shifting lever operatively connected with one internal gear wheel, and link rods connecting said lever with the internal gear wheels, each link rod being slotted to admit of longitudinal movement relatively to the internal gear wheel upon which it acts, and a spring carried by said link rod acting to resist such relative movement.

8. In transmission gearing, a driving gear, a driven shaft, an intermediate gear revolubly mounted on said shaft and provided with an internal gear face, means causing said intermediate gear to revolve with the shaft and slide thereon, said driving gear and intermediate gear having clutch faces, a clutch collar rotatable around the axis of said shaft and provided with clutch faces to engage the clutch faces of the driving and intermediate gears, planetary pinions carried by said clutch collar, means for shifting said clutch faces into and out of engagement, and means for holding said clutch collar stationary or permitting the same to revolve.

9. In transmission gearing, a driving gear, a driven shaft, an intermediate gear revolubly and slidably mounted on said shaft and provided with an internal gear face, means causing said intermediate gear to revolve with the shaft and slide thereon, said driving gear and intermediate gear having clutch faces, a clutch collar rotatable around the axis of said shaft and provided with clutch faces to engage the clutch faces of the driving and intermediate gears, planetary pinions carried by said clutch collar, means for shifting said clutch faces into and out of engagement, and means for holding said clutch collar stationary or permitting the same to revolve.

10. In transmission gearing, a driving gear, a driven shaft, an intermediate gear revolubly mounted on said shaft and provided with an internal gear face, means causing said intermediate gear to revolve with the shaft and slide thereon, said driving gear and intermediate gear having clutch faces, a clutch collar rotatable around the axis of said shaft and provided with clutch faces to engage the clutch faces of the driving and intermediate gears, planetary pinions carried by said clutch collar, means for shifting said clutch faces into and out of engagement, and means for holding said clutch collar stationary or permitting the same to revolve, the last named means embodying a normally loose clutch band surrounding said clutch collar, and manually controlled means for contracting said band around the clutch collar when the latter is out of clutching position.

11. In transmission gearing, a driving gear, a driven shaft, an intermediate gear revolubly mounted on said shaft and provided with an internal gear face, means causing said intermediate gear to revolve with the shaft and slide thereon, said driving gear and intermediate gear having clutch faces, a clutch collar rotatable around the axis of said shaft and provided with clutch faces to engage the clutch faces of the driving and intermediate gears, planetary pinions carried by said clutch collar, means for shifting said clutch faces into and out of engagement, means for holding said clutch collar stationary or permitting the same to revolve, the last named means embodying a normally loose clutch band surrounding said clutch collar, an operating lever, slotted link rods actuated by said lever, and dogs moved by said link rods and acting on said clutch band to contract the latter around said clutch collar when the latter is out of clutching position.

In testimony whereof I affix my signature in presence of two witnesses.

GEORGE W. DRAPER.

Witnesses:
  ABNER T. EDWARDS,
  WILLIAM H. WILLIAMS.

Copies of this patent may be obtained for five cents each, by addressing the "Commissioner of Patents, Washington, D. C."